Dec. 27, 1927.  
J. H. ASHBAUGH  
1,654,317  
VOLTAGE BALANCING REGULATOR  
Filed Jan. 2, 1926  
2 Sheets-Sheet 1

WITNESSES:

INVENTOR  
John H. Ashbaugh.  
BY  
ATTORNEY

Dec. 27, 1927.

J. H. ASHBAUGH 1,654,317

VOLTAGE BALANCING REGULATOR

Filed Jan. 2, 1926

2 Sheets-Sheet 2

WITNESSES:
E. G. McCloskey.
F. E. Hardy

INVENTOR
John H. Ashbaugh.
BY Wesley G. Carr
ATTORNEY

Patented Dec. 27, 1927.

1,654,317

UNITED STATES PATENT OFFICE.

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA.

VOLTAGE-BALANCING REGULATOR.

Application filed January 2, 1926. Serial No. 78,830.

My invention relates to regulator systems, and more particularly to a system for balancing the voltage of two circuits that are to be connected together.

One object of my invention is to provide a regulator system of the above-indicated character that is simple in construction and is sensitive in operation over a wide range of voltage values.

When two power circuits are to be connected together, or when a generator is to be connected to a power circuit, it is important that the voltages of the two systems correspond in value, in order to prevent undue shock to the circuits involved. It is desirable, in many cases, that the balancing of the voltage of the two systems should be done automatically, as, for example, when a generator in an automatic substation is to be connected to the power circuit.

In practicing my invention, I make use of a primary relay having a single magnetic core that is polarized, either permanently or electrically by means of a polarizing coil, and is provided with two differentially related windings that are connected to the two circuits, the voltages of which are to be balanced. This relay operates means for varying the voltage of one of said circuits so as to correspond to the value of the voltage in the other circuit.

Figure 1:
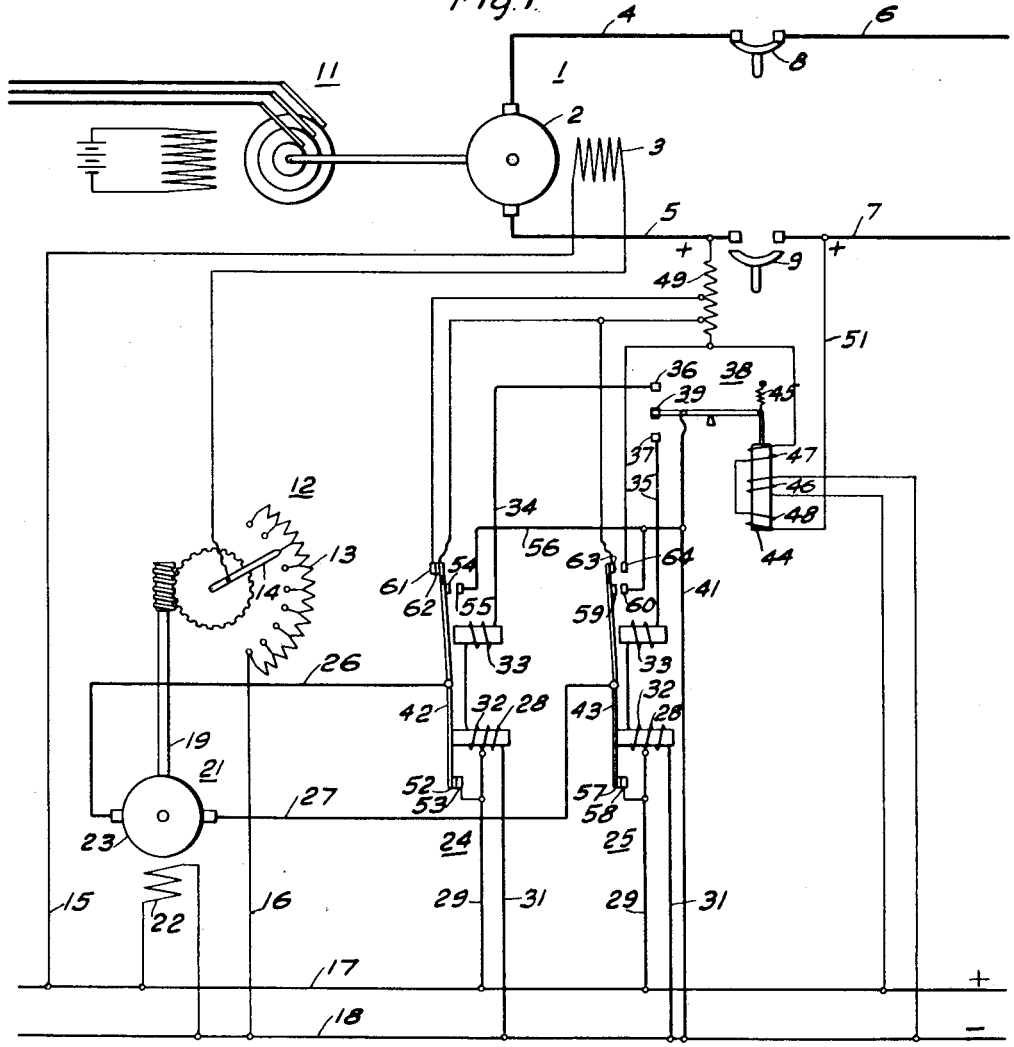
Figure 2:
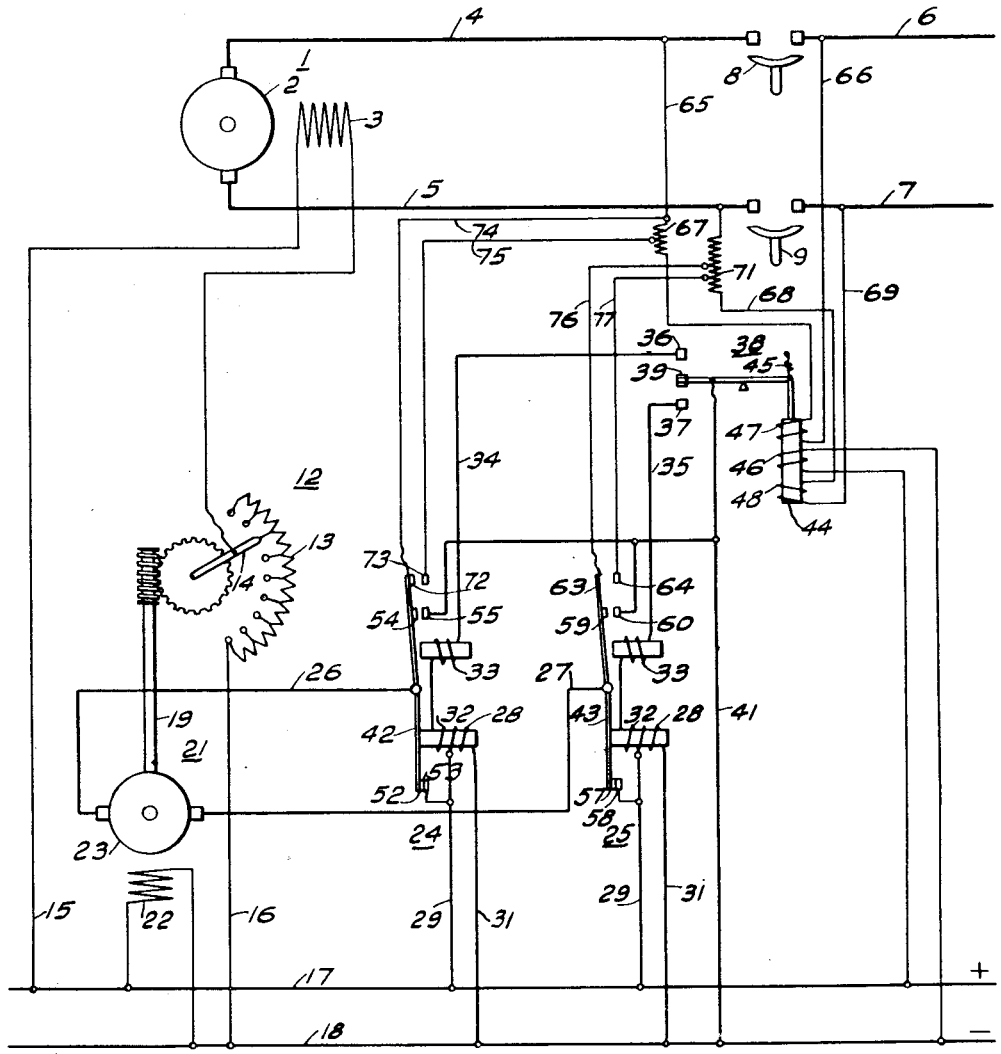

My invention will be better understood by reference to the accompanying drawing, in which Figure 1 is a diagrammatic view of one preferred form of the invention, and Fig. 2 illustrates a modified form of the invention.

Referring to Fig. 1 of the drawing, a direct-current generator 1 is illustrated as provided with an armature winding 2 and a field winding 3, and with terminal conductors 4 and 5 that are adapted to be connected to power-circuit or supply conductors 6 and 7 by means of circuit-breakers or switches 8 and 9, respectively. The generator 1 may be driven by any suitable means, such as an alternating-current motor 11.

In circuit with the field-winding 3 of the direct-current generator, a motor-operated rheostat 12 is provided, having a resistor element 13 and a movable contact making arm 14. The rheostat is connected by means of conductors 15 and 16 in circuit with the field winding and to direct-current supply conductors 17 and 18. The rheostat 12 is operated by means of a shaft 19 that is actuated by a pilot motor 21. The pilot motor 21 is provided with a field winding 22, which is connected to the supply-circuit conductors 17 and 18, and an armature winding 23, which is connected, by means of conductors 26 and 27, to reversing switches 24 and 25.

The reversing switches 24 and 25 are each provided with a holding coil 28 that is connected across the supply-circuit conductors 17 and 18 by means of conductors 29 and 31, and with a neutralizing coil 32 that is wound upon the same magnetic core as the holding coil 28 and is differentially related to the holding coil. An operating coil 33 that is provided, is in series circuit relation with the neutralizing coil 32, and is wound upon a second magnetic core of each reversing switch. The operating coils 33 of the switches 24 and 25 are respectively connected by means of conductors 34 and 35 to stationary contact members 36 and 37 of a primary relay 38.

A movable contact member 39 also constitutes a part of the primary relay 38 and is connected by means of conductor 41 to supply conductor 18. Contact member 39 is adapted upon engagement with one of the stationary contact members 36 or 37, to complete a circuit through one of the operating coils 33 and the corresponding neutralizing coil 32, thereby causing the contact-making arm 42 or 43 of the corresponding reversing switch 24 or 25 to be actuated to its second operative position.

The primary relay 38 also comprises a magnetic core 44 for operating the movable contact member 39 and counter-balancing means, such as the spring 45, for overcoming the weight of the magnetic core. The core 44 may be provided with a polarizing coil 46, which is connected to the supply conductors 17 and 18 and serves to normally energize the core 44 so as to give it a definite polarity and to retain it centrally disposed with respect to the coil. A pair of differentially related coils 47 and 48 are also provided, and are connected in series circuit relation with each other and through a resistor 49 and conductor 51 to the conductors 5 and 7, respectively; that is, to opposite terminals of circuit-breaker 9.

The reversing switch 24 is further provided with a contact member 52 that is carried by the movable arm 42, which contact member is normally held in engagement with a stationary contact member 53 by the holding coil 28, and is included in a circuit from the pilot motor armature 23 through conductors 26 and 29 to supply conductor 17. The switch 24 is also provided with an upper movable contact member 54 that cooperates with stationary contact member 55 to complete a circuit from the conductor 26 through conductors 56 and 41 to the other supply conductor 18, upon operation of the reversing switch 24 to its second operative position.

Similarly, the reversing switch 25 is provided with lower cooperating contact members 57 and 58 and with upper cooperating contact members 59 and 60 that are adapted to respectively connect the conductor 27 through conductor 29 to supply conductor 17, or through conductor 41 to the supply conductor 18. The reversing switch 24 is also provided with normally engaging contact members 61 and 62 that are so connected as to short-circuit a portion of the resistor 49 when the switch 24 is in its first operative position. The reversing switch 25 is provided with cooperating contact members 63 and 64 that are so connected to the resistor 49 as to short-circuit a portion thereof, upon the reversing switch being operated to its second operative position.

When it is desired to connect the generator 1 to power-circuit conductors 6 and 7, the circuit-breaker or switch 8 may be closed, while the circuit-breaker 9 should remain open until the voltages of the generator 1 and of the power circuit 6, 7 are balanced. The current flowing through coils 47 and 48 of the primary relay 38 will be a measure of the difference in voltage between the two circuits, both as to direction and degree. Should the voltage across conductors 4 and 5 be greater than that across conductors 6 and 7, current will flow in one direction through coils 47 and 48, but should the voltage across conductors 4 and 5 be less than that across conductors 6 and 7, then current will flow in the opposite direction through coils 47 and 48.

Inasmuch as the coils 47 and 48 are differentially related with respect to each other, the fluxes produced by these two coils alone will tend to neutralize each other, but inasmuch as the coil 46 gives a definite polarity to the magnet core 44, the effect of the three coils 46, 47 and 48 is to shift the point of maximum flux density with respect to the center of the coil 46 either upwardly or downwardly, depending upon whether the fluxes from the coils 46 and 47 on the fluxes from the coils 46 and 48 are in the same direction.

As the point of maximum flux density is shifted upwardly or downwardly, with respect to the center of the coil 46, the magnetic core 44 will be correspondingly actuated upwardly or downwardly, thereby operating the relay 38 so as to cause engagement of the contact member 39 with the contact member 37, or with the contact member 36, to effect operation of one of the reversing switches 24 and 25.

In the illustrated positions of the reversing switches 24 and 25, both terminals of the pilot motor armature 23 are connected by means of conductors 26 and 27 through the reversing switches to supply conductor 17, thus completing a suitable dynamic braking circuit. As one of the reversing switches 24 or 25 is operated to its second position, the corresponding conductor 26 or 27 will be connected to conductor 56 and through conductor 41 to supply conductor 18, thus causing the pilot motor 21 to operate in the one or in the other direction, thereby actuating the rheostat 12 to raise or lower the voltage of the generator 1. This operation will continue until the value of the voltage across the conductors 4 and 5 is substantially equal to that across the conductors 6 and 7, at which value no current will flow through the coils 47 and 48, and the coil 46 will again hold the magnet core 44 in its central or neutral position.

The action of the auxiliary contact members 61 to 64, inclusive, of the reversing switches 24 and 25, is to increase or decrease the value of the resistor 49 as the reversing switches are operated, thereby decreasing or increasing the energization of the coils 47 and 48 at the proper time to prevent "hunting" action of the relay 38.

The form of invention illustrated in Fig. 2 is similar to that illustrated in Fig. 1, excepting that the differentially related coils 47 and 48 are connected respectively to conductors 4 and 6, and conductors 5 and 7; or, in other words, these coils are respectively connected across circuit-breakers 8 and 9. In this case, both of the switches or circuit-breakers 8 and 9 should remain open until the voltage across the generator conductors 4 and 5 is balanced with that across the supply conductors 6 and 7. The coil winding 47 is connected through a resistor 67 and, by means of conductors 65 and 66, across the open line switch 8, while the coil 48 is connected through a resistor 71 and, by means of conductors 68 and 69, across the other line switch 9.

The reversing switch 24 is further provided with auxiliary contact members 72 and 73 that are engaged upon the operation of the switch 24 to its second operative position to short-circuit a portion of the resistor 67 through conductors 74 and 75. The reversing switch 25 is provided with similar auxiliary contact members 63 and 64 which, upon the operation of the reversing switch 25 to its second operative position, short-circuits a portion of resistor 71 through conductors 76 and 77. In this form of the invention, the coils 47 and 48 are respectively provided with resistors 67 and 71, portions of which are short-circuited at the proper time to prevent "hunting action" of the relay 38, the flux produced by one of the coils 47 and 48 only being varied to prevent such "hunting action".

Other modifications of the apparatus and circuits shown may be made without departing from the spirit of my invention, and I do not wish to be limited other than by the scope of the appended claims.

I claim as my invention:

1. In a voltage-balancing system, a dynamo-electric machine circuit, a power circuit, and means for varying the voltage of one of said circuits to correspond to that of the other circuit, said means comprising a polarized relay having a pair of differentially wound coils connected to the respective circuits.

2. In a voltage-balancing system, a dynamo-electric machine, a power circuit, means for varying the voltage of said machine to correspond to that of said power circuit, and means comprising a relay having a single magnetic core and three coils, means for energizing one of said coils for polarizing said core, and means for energizing said remaining two coils in accordance with the difference in voltage between said circuit and said machine.

3. In a voltage-balancing system, a power circuit, a dynamo-electric machine, and means for varying the voltage of said machine in accordance with the voltage of said power circuit, said means comprising a relay having a single magnetic core, a polarizing coil, and a pair of differentially related coils on opposite sides of said polarizing coil.

4. In a voltage-balancing system, a pair of power circuit conductors, a dynamo-electric machine, and means for varying the voltage of said machine in accordance with the voltage of said power-circuit conductors, said means comprising a relay having a single magnetic core, a polarizing coil for said core, and a pair of coils each connected between one of said power-circuit conductors and said machine.

5. In a voltage-balancing system, a power circuit, a dynamo-electric machine, means for varying the voltage of said machine in accordance with the voltage of said power circuit, said means comprising a relay having a single magnetic core, a polarizing coil for said core, a pair of differentially related coils on opposite sides of said polarizing coil, and means for energizing said last-named coils in accordance with the difference in voltage between said circuit and said machine.

6. In a regulator system, a power circuit, a dynamo-electric machine, means for varying the voltage of said machine comprising a relay having a single magnetic core, a polarizing coil for said core, and a pair of differentially related coils for said core, and means for energizing said differentially related coils in direction and degree in accordance with the variation in the voltage of said machine from the voltage of said power circuit.

7. In a voltage-balancing system, two circuits that are adapted to be connected together, means for varying the voltage of one of said circuits to correspond to the voltage of the other circuit, said means comprising a relay having a single magnetic core and a pair of differentially related coils, and means for energizing said coils in accordance with the difference in voltage between said two circuits.

8. In a voltage-balancing system, two circuits that are adapted to be connected together, means for varying the voltage of one of said circuits to correspond to the voltage of the other circuit, said means comprising a relay having a single magnetic core and a pair of differentially related coils, and means for energizing said coils in accordance with the degree and direction of voltage of the controlled circuit with respect to said other circuit.

9. In a voltage-balancing system, a dynamo-electric machine, a power circuit, and means for varying the voltage of said machine to correspond to the voltage of said power circuit comprising means connected between said machine and said power circuit that is actuated in accordance with the flow of current therebetween.

10. In a voltage-balancing system, a dynamo-electric machine, a power circuit, and means for varying the voltage of said machine to correspond to that of said power circuit, said means comprising an operating contact member and means connected between said machine and said power circuit for actuating said contact member in accordance with the flow of current therebetween.

11. In a voltage-balancing system, a dynamo-electric machine, a power circuit, and means for varying the voltage of said machine to correspond to that of said power circuit comprising means connected between said machine and said power circuit that is actuated in accordance with the direction and amount of current flow therebetween.

In testimony whereof, I have hereunto subscribed by name this 7th day of December 1925.

JOHN H. ASHBAUGH.